Nov. 28, 1933.    E. V. TAYLOR    1,936,865
BRAKE
Filed Aug. 14, 1931    2 Sheets-Sheet 1

INVENTOR.
EUGENE V. TAYLOR
BY
ATTORNEY.

Nov. 28, 1933.    E. V. TAYLOR    1,936,865
BRAKE
Filed Aug. 14, 1931    2 Sheets-Sheet 2

INVENTOR.
EUGENE V. TAYLOR
BY O. H. Fowler
ATTORNEY.

Patented Nov. 28, 1933

1,936,865

UNITED STATES PATENT OFFICE 1,936,865

BRAKE

Eugene V. Taylor, Chicago, Ill., assignor to Bendix Brake Company, South Bend, Ind., a corporation of Illinois Application August 14, 1931. Serial No. 557,073

9 Claims. (Cl. 188—78)

This invention relates to brakes and more particularly to internal expanding brakes.

Broadly, the invention comprehends means for controlling the servo action of the brake through a simple means arranged to transmit thrust from the primary shoe to the secondary shoe and to so distribute the applied pressure as to increase the effectiveness of the secondary shoe.

In the illustrated embodiment of the invention, the brake includes a primary shoe and a secondary shoe and means between the separable ends of these elements for actuating the shoes together with a simple structure for transmitting the applied force from the secondary shoe to the primary shoe, the transmitting means being adjustable so that the shoes may be retained when in the off position in proper spaced relation to the drum.

In one embodiment of the invention, the brake includes an adjustable ramp having positioned for movement thereon a miniature carriage including two rollers arranged for engagement respectively with the articulated ends of the primary and secondary shoes or rollers carried thereon.

An object of the invention is to provide a brake including a primary and secondary shoe and means for transmitting the applied force from the primary shoe to the secondary shoe with increased effectiveness.

Another object of the invention is to provide a brake comprising a primary shoe and a secondary shoe and means connected between the articulated ends of the shoes including means for transmitting the applied force to the secondary shoe and means for adjusting the transmitting means to increase or decrease the overall length of the primary and secondary shoes.

A feature of the invention is an adjustable ramp and a rotatable member movable thereon engaging rotatable members on the friction elements.

Another feature of the invention is an adjustable ramp and a miniature carriage movable on the ramp, with the rollers on the carriage engaging rollers on the friction elements of the brake.

Other objects and features of the invention will appear from the following description taken in connection with the drawings, which form a part of this specification, and in which.

Figure 1:
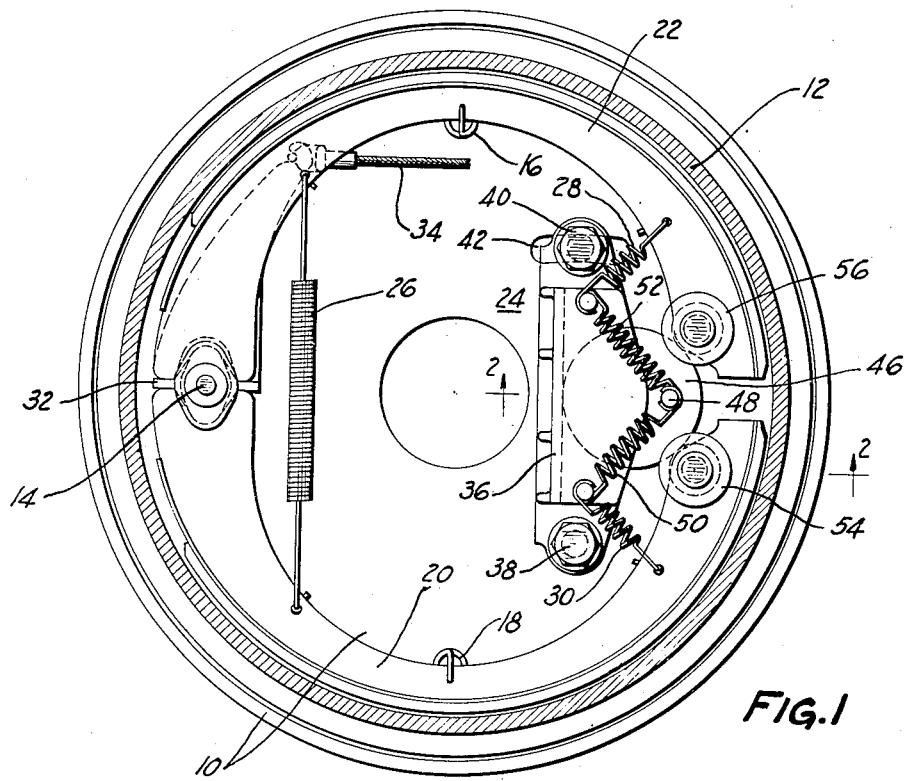
Fig. 1 is a sectional view of a brake taken just back of the head of the drum illustrating the friction elements in side elevation and showing the invention as applied.

Referring to the drawings for more specific details of the invention, 10 represents a fixed support such as a backing plate. The backing plate has associated therewith a rotatable drum 12 which may be secured to a wheel, not shown. The backing plate has positioned thereon a fixed anchor 14 and suitable steady rests 16 and 18.

Positioned for movement on the backing plate and supported by the steady rests 16 and 18 is a primary shoe 20, and a secondary shoe 22. The separable ends of the shoes 20 and 22 embrace the anchor 14 and the articulated ends of the shoes engage a combined force transmitting and adjustable device indicated generally at 24.

The separable ends of the primary and secondary shoes are connected by a return spring 26 and the articulated ends of the shoes are connected respectively by return springs 28 and 30 to the adjusting member to be hereinafter described. These springs serve to return and retain the shoes in the off position. A floating operating lever 32 is positioned between the separable ends of the friction elements and suitably connected to the lever is a tension member 34 leading to a suitable source of power, not shown.

The combined power transmitting and adjusting means 24 includes a ramp 36 having one end pivoted on the backing plate as indicated at 38 and provided at its other end with an adjusting means including a bolt 40 extending through a slot 42 in the backing plate. By adjusting the ramp the relative position of the primary shoe 20 and the secondary shoe 22 to the drum surface may be determined.

As shown, the ramp is provided with a slot 44 in which is positioned for rotation a disk or roller 46 having eccentrically positioned thereon a pin 48 connected as by springs 50 and 52 to the ramp. These springs serve to retain the roller 48 against displacement and permit slight rotation thereof, so that it may travel on rollers 54 and 56 suitably secured to the articulated ends of the shoe. As shown, the rollers 54 and 56 are built up from a plurality of disks to engage the face of the roller 46 and to embrace the sides of the roller.

In this embodiment of the invention, force is applied to spread the primary and secondary shoes into drum engagement. The primary shoe is given a slight centrifugal movement by the wiping action of the drum. The applied force on the separable end of the primary shoe is augmented by the wiping action of the drum and this force is transmitted through the disk or roller 46 to the secondary shoe with increased effectiveness.

Figure 3:
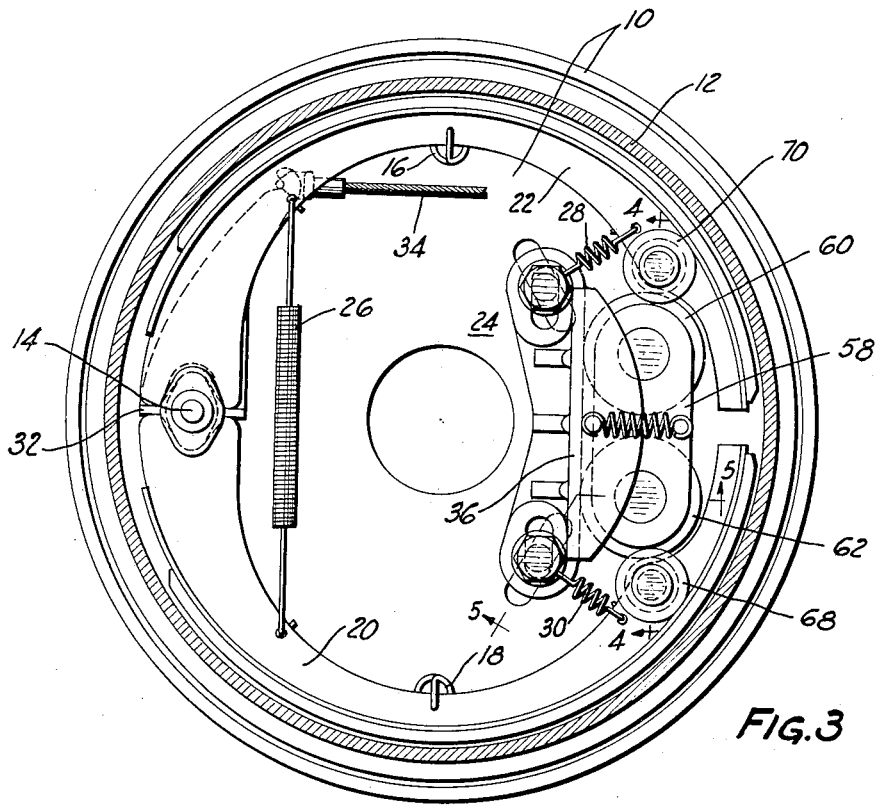
Fig. 3 is a sectional view of a brake taken just back of the head of the drum illustrating the friction elements in side elevation and showing a modification of the invention as applied.
Figures 4, 5:
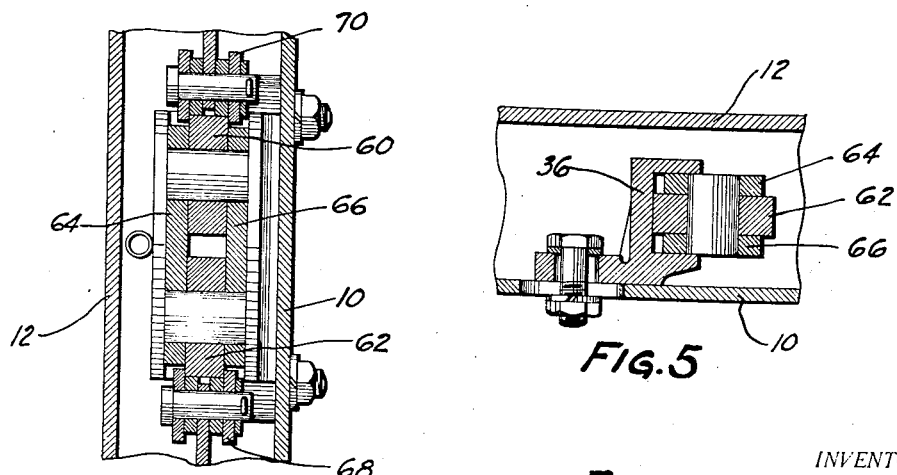
Fig. 4 is a sectional view taken substantially on line 4—4, Fig. 3.
Fig. 5 is a sectional view taken substantially on line 5—5, Fig. 3.

A modification of the invention is illustrated in Figs. 3, 4, and 5, wherein a miniature carriage 58 is mounted for travel on the ramp 36. In this modification, the ramp is made adjustable at both ends, so that the thrust from the primary shoe may be transmitted to the secondary shoe at various angles to distribute the pressure as may be desired. In this embodiment of the invention, the miniature carriage 58 includes two rollers 60 and 62 mounted for rotation between parallel plates 64 and 66. The roller 62 engages a roller 68 on the primary shoe and the roller 60 engages a roller 70 on the secondary shoe.

Figure 2:
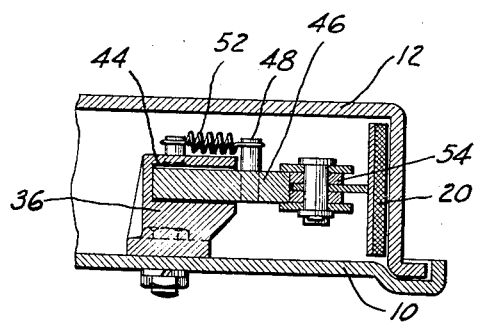
Fig. 2 is a sectional view taken substantially on line 2—2, Fig. 1.

The operation of this structure is substantially the same as the operation of the preferred form, the only difference being the employment of two rollers 60 and 62 in lieu of the roller 46 illustrated in Figs. 1 and 2. The only other difference in the structure is the particular means for adjusting the ramp on the backing plate so that the applied force may be transmitted from the primary shoe to the secondary shoe at different angles.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising friction elements, a ramp arranged adjacent the ends of the friction elements, and a roller device movable on the ramp having engagement with the ends of the friction elements.

2. A brake comprising friction elements, a ramp arranged adjacent the ends of the friction elements, means for adjusting the ramp, and a member positioned for travel on the ramp engaging the ends of the friction elements.

3. A brake comprising friction elements, an operating member between the separable ends of the friction elements, a ramp arranged adjacent the other ends of the friction elements, means for adjusting the ramp, a member positioned for travel on the ramp, means for retaining the member on the ramp, and rollers on the ends of the friction elements engaging the member on the ramp.

4. A brake comprising friction elements, an operating member positioned between the separable ends of the friction elements, a ramp positioned adjacent the other ends of the friction elements, means for adjusting the ramp, a member positioned for travel on the ramp, rollers on the ends of the friction elements engaging the member positioned for travel on the ramp, and means for retaining a member on the ramp.

5. A brake comprising a fixed support, friction elements positioned for movement on the support, a floating operating lever positioned between the separable ends of the friction elements, a ramp adjustable on the fixed support, a roller positioned for movement on the ramp, and rollers on the other ends of the friction elements engaging the roller on the ramp, and means for yieldingly retaining the roller on the ramp.

6. A brake comprising a fixed support, friction elements positioned for movement on the support, a floating operating lever positioned between the separable ends of the friction elements, a ramp adjustably positioned on the backing plate adjacent the other ends of the friction elements, a carriage positioned for travel on the ramp, and rollers on the carriage engaging the ends of the friction elements.

7. A brake comprising a fixed support, friction elements positioned for movement on the support, a floating operating lever positioned between the separable ends of the friction elements, a ramp adjustably positioned on the fixed support, a carriage positioned for travel on the ramp, means for retaining the carriage against radial displacement, rollers on the carriage, and rollers on the other ends of the friction elements engaging the rollers on the carriage.

8. A brake comprising a fixed support, a friction elements positioned for movement on the support, a floating operating lever positioned between the separable ends of the friction element, a ramp adjustably mounted on the backing plate adjacent the other ends of the friction element, flanges on the ramp, a carriage positioned for travel on the ramp between the flanges, a spring for retaining the carriage on the ramp, and rollers on the carriage engaging rollers on the ends of the friction elements.

9. A brake comprising a fixed support, a rotatable drum associated therewith, friction elements positioned on the support adaptable for co-operation with the drum, a floating operating cam positioned between the separable ends of the friction element, a ramp positioned on the fixed support adjacent the other ends of the friction element, flanges on the ramp, means for adjusting the ramp, rollers on the ramp between the flanges, means for retaining the carriage against displacement, and rollers on the friction elements engaging the rollers on the carriage.

EUGENE V. TAYLOR.